US010625460B2

(12) United States Patent
Gillet et al.

(10) Patent No.: US 10,625,460 B2
(45) Date of Patent: Apr. 21, 2020

(54) INJECTION DEVICE FOR A FORMING AND FILING A CONTAINER USING A PRESSURIZED LIQUID

(71) Applicant: DISCMA AG, Zürich (CH)

(72) Inventors: Denis Gillet, Octeville sur Mer (FR); Massimo Nascimbeni, Octeville sur Mer (FR)

(73) Assignee: Discma AG, Zürich (CH)

( * ) Notice: Subject to any disclaimer, the term of this patent is extended or adjusted under 35 U.S.C. 154(b) by 363 days.

(21) Appl. No.: 15/429,576

(22) Filed: Feb. 10, 2017

(65) Prior Publication Data
US 2017/0232655 A1    Aug. 17, 2017

(30) Foreign Application Priority Data
Feb. 11, 2016 (EP) ...................... 16305158

(51) Int. Cl.
| B29C 49/46 | (2006.01) |
| B29C 49/42 | (2006.01) |
| B65B 3/02 | (2006.01) |
| B65B 3/12 | (2006.01) |
| B29C 49/06 | (2006.01) |
| B29K 105/00 | (2006.01) |
| B29L 31/00 | (2006.01) |

(52) U.S. Cl.
CPC .......... B29C 49/46 (2013.01); B29C 49/4289 (2013.01); B65B 3/022 (2013.01); B65B 3/12 (2013.01); *B29C 49/06* (2013.01); *B29C 2049/4664* (2013.01); *B29K 2105/258* (2013.01); *B29L 2031/7158* (2013.01)

(58) Field of Classification Search
None
See application file for complete search history.

(56) References Cited

U.S. PATENT DOCUMENTS

| 2015/0183150 A1 | 7/2015 | Chauvin et al. |
| 2019/0030779 A1* | 1/2019 | Gillet ...................... B29C 49/46 |

FOREIGN PATENT DOCUMENTS

| EP | 2823948 A1 | 1/2015 |
| EP | 2883800 A1 | 6/2015 |

* cited by examiner

*Primary Examiner* — Monica A Huson
(74) *Attorney, Agent, or Firm* — Eric J. Sosenko; Jonathan P. O'Brien; Honigman LLP

(57) ABSTRACT

An injection device for injecting a pressurized liquid into the preform. The injection device includes a piston device having a piston body with a piston head arranged to reciprocate therein. The piston head cooperates with a sealing portion of the piston body to fluidicly isolate an inner chamber of the piston device. The piston body being in fluidic communication with a liquid source for admitting liquid into the inner chamber. The piston body including at least two outlet ducts for delivering pressurized liquid to the injection head. Each outlet duct opening defining an outlet port in a wall of the inner chamber. Each outlet port being centered on an outlet port center, wherein all the outlet port centers extend in the same radial planes of the inner chamber, are at the same distance from the piston axis and are arranged angularly in a regular manner around the piston axis.

15 Claims, 7 Drawing Sheets ized, and an injection head, or injection nozzle, fluidicly
INJECTION DEVICE FOR A FORMING AND FILING A CONTAINER USING A PRESSURIZED LIQUID

TECHNICAL FIELD OF THE INVENTION

The invention generally relates to the field known as hydroforming, of forming containers from preforms using a liquid to deform the preforms and fill the obtained containers with the liquid. More specifically, the invention relates to an injection device for a forming and filling station for forming a preform into a container and filling the container using a pressurized liquid and to a method for performing the same.

BACKGROUND

A traditional injection device comprises a piston device including an inner chamber wherein the liquid is pressurized, and an injection head, or injection nozzle, fluidicly connected to the piston device. A connection duct communicates the pressurized liquid from an outlet port of the inner chamber toward the injection head. When the injection device is part of a hydroforming station, the injection device is designed to inject the liquid at a predetermined pressure profile and flow rate adapted to urge a preform against the wall of a mold cavity having the shape of the container to be produced. Advantageously, the injected liquid is the end product to be contained in the formed container.

Prior to container or bottle production, both the piston device and the injection head have to be purged of air with the liquid, with a minimized liquid loss. Later in this patent application, this operation phase is called "air purge".

Another operation phase of a piston device connected to an injection head is to allow the liquid in the inner chamber of the piston device to be drained out of the inner chamber through a drainage port. A well-known location of the drainage port is at a lowest point of the inner chamber.

For the production mode, the piston device is arranged to draw in liquid from the liquid source and to inject it at a predetermined pressure and flow rate in the injection head. Maximum pressure in the inner chamber is high, for example as high as 60 bars, but preferably below 40 bars. Piston speed can be as high as 1 m/s generating a flow up to 200 l/s, in particular when the hydroforming station uses forming liquid at a temperature below the glass transition temperature of the preform material. Also, in order to achieve a high production rate of the hydroforming station, the piston head is moved back and forth at high frequency, such as 1 Hz.

The inventors have discovered a problem happening in the piston device of a hydroforming station. As such a piston device has to be operated with simultaneously high liquid pressure and high flow rate, the piston and its sealing gasket may be subjected to mechanical efforts that urge it laterally toward the piston body, with a risk, particularly after some time, of damaging the sealing gasket and experiencing localized and early wear issues, increasing the frequency and cost of maintenance of the system. When the gasket is worn, liquid tightness between the piston head and the piston body is no longer ensured and the piston device is no longer able to fulfil its function of pressurizing the liquid and of urging the liquid toward the injection head. Furthermore, using the piston device in such a state would lead to soiling the hydroforming station with the liquid leaking out of the piston device.

One of the aims of the invention is to provide an injection device that reduces the above mentioned risk of wear.

In case of product changeover, pushing with the new product must not generate product losses or must minimize product losses as much as possible.

Hygiene is a very important criteria in all transition and all production steps to guaranty consumer safety from direct food contact point of view in case of beverage or skin contact for non-food products. For that purpose, prior any production, a cleaning in place (CIP) cycle is conducted. Such CIP is also done at regular intervals during the production phases. The CIP cycle may vary according to the type of product that is produced and according to the producer specification. It is important that during this cycle, a turbulent flow can be created in order to remove any residual contaminant or micro-organism for any area of the injection device in contact with the forming product. A specific care is to be taken on seals and gaskets in order to make sure that cleaning product flow reaches all the recesses and parts in contact with the product.

Another aim of the invention is to provide an injection device that minimizes the CIP time providing a very efficient cleaning, with a minimized amount of cleaning product.

SUMMARY OF THE INVENTION

To this end, the invention relates to an injection device for a forming and filling station for forming a preform into a container and filling the container using a pressurized liquid, the injection device comprising: at least one injection head for injecting the pressurized liquid into the preform, and at least one piston device having a piston body, and a piston head arranged to reciprocate in the piston body along a piston axis, the piston head cooperating in a liquid tight manner with a sealing portion of the piston body as to fluidicly isolate an inner chamber of the piston device, the piston body having an inlet duct intended to be in fluidic communication with a liquid source for admitting liquid into the inner chamber, wherein the piston body comprises at least two outlet ducts for delivering pressurized liquid from the inner chamber to the injection head, each outlet duct opening into the inner chamber and defining an outlet port in a wall of the inner chamber each outlet port being centered on an outlet port center, wherein all the outlet port centers extend in the same radial plane of the inner chamber, at the same distance from the piston axis and are arranged angularly in a regular manner around the piston axis, the angle formed by two successive outlet ports with the piston axis being constant.

The inventors have discovered that the speed of the pressurized liquid flowing through the outlet ducts creates a dynamic effect having a dynamic impact on the reaction force exerted by the liquid on the piston head. The inventors have discovered that placing the outlet ports equally distributed around the piston head makes the various dynamic impacts at each outlet port compensated by each other. Consequently, the resultant mechanical effort imparted on the piston head by the liquid in the inner chamber is applied in a direction substantially parallel to the piston axis or substantially equal to zero. This greatly reduces the risks of wearing the sealing gasket of the piston head since the piston head is no longer urged laterally toward the piston body.

According to another feature of the invention, the injection head comprises an injection chamber, the outlet ducts communicating liquid from the inner chamber of the piston body to the injection chamber of the injection nozzle, the outlet ducts being configured to generate an equal liquid pressure drop between the outlet ports and the injection chamber during liquid injection into the preform.

In other words, the liquid flowing through each outlet duct presents a pressure difference between the outlet ports and the injection chamber. The liquid flows through all the outlet ducts simultaneously during liquid injection into the preform. The outlet ducts are configured such that the liquid presents the same pressure difference or pressure drop.

Making sure that the outlet ducts are configured to generate an equal liquid pressure drop between the outlet ports and the injection chamber during liquid injection into the preform allows guarantying an equal intensity of each of the dynamic impacts located about each outlet ports. This makes the compensation between the various dynamic impacts more efficient, whereby the mechanical efforts applied on the piston head by the liquid in the inner chamber are indeed applied in a direction substantially parallel to the piston axis or substantially equal to zero.

In order to do so, the outlet ducts can be arranged such that each of the outlet ducts has an upstream portion extending within a meridian plane passing by the piston axis wherein the axis of each upstream portion forms an angle with the piston axis which is the same for each outlet duct, and wherein the cross section profile and the shape of the outlet ducts are such that the speed of the liquid passing thought each outlet port is identical or almost identical.

According to a particular embodiment of the invention the inner chamber of the piston device is in fluidic communication with the injection head by only two outlet ducts which are symmetrical to each other with respect to a symmetry plan containing the piston axis.

Arranging the two outlet ducts in a symmetrical manner relative to a plane containing the piston axis places the outlet ports in the same radial planes of the inner chamber, at the same distance from the piston axis and angularly arranged in a regular manner around the piston axis. Furthermore, such outlet ducts generate an equal liquid pressure drop between the outlet ports and the injection chamber during liquid injection into the preform.

According to particular features of the invention: each of the outlet ducts has an upstream portion extending along a duct direction substantially tangent to the wall of the inner chamber; the wall of the piston body is substantially cylindrical, conical, or substantially has the shape of a truncated cone; the piston head is designed to occupy an extreme down sealed position with respect to the piston body during reciprocation, the inner chamber having a volume that is minimal when the piston head is in the extreme down sealed position, the inlet port opening at a lowermost area of the inner chamber and each outlet port being located at an uppermost area of the inner chamber when the piston head is in the extreme down sealed position.

Placing the the inlet port at a lowermost area of the inner chamber and each outlet port at an uppermost area of the inner chamber improves the evacuation of air when the inner chamber is first filled with liquid. Placing the outlet ports at the highest point of the inner chamber helps the air bubbles escape the inner chamber. Consequently, the air purge can be performed efficiently and with a minimal liquid loss.

According to another feature of the invention, the piston body comprises a recess portion extending in the inner chamber wherein the piston head is not in liquid tight contact with the piston body such that liquid can flow from the inner chamber to a part of the piston body extending on the side of the piston head opposite the inner chamber when the piston head is placed in the recess portion.

The recess portion is used for performing CIP by placing the piston head in the recess portion. In the recess portion, cleaning liquid injected in the inner chamber can flow all around the piston head and can therefore reach all the recesses and parts in contact with the liquid product injected during production, in particular the recesses and parts of the sealing gasket of the piston head. It is known to place such a recess portion above the inner chamber, i.e. in the upper side of the piston body not intended to be in contact with the liquid product to be injected in the preform. Placing the recess portion in the inner chamber allows, in addition to other advantages explained below, reducing the volume of the piston body since there is no need to provide an extra space for the recess portion in the upper part of the piston body.

According to other features of the invention: the recess portion is an annular groove extending around the inner chamber and locally enlarging the radial dimension of the inner chamber measured perpendicularly to the piston axis; the outlet ports open into the recess portion; the piston body comprises a cylindrical portion comprising the sealing portion along which the piston head is in liquid tight contact with the piston body and a lowermost area of the inner chamber, the recess portion extending between the sealing portion and the lowermost area.

This arrangement is particularly advantageous in that it reduces the space requirement for the piston body along the piston axis since there is no need to have a space in the inner chamber for the outlet ports and another space for the recess portion.

According to other features of the invention, the piston head comprises a sealing gasket ensuring liquid tight contact between the piston head and the sealing portion, the sealing gasket comprising a lip oriented towards the inner chamber, such that the lip can be applied against the sealing portion without being turned over when the piston head is moved from the recess portion away from the lowermost area.

This embodiment is particularly advantageous compared to the conventional recess portion placed in the upper part of the piston body. When the recess portion is placed in the upper part of the piston body, there is a risk of damaging and/or misplacing the lip of the sealing gasket when the piston head is moved from the CIP configuration, wherein the piston head is placed in the recess portion, to a production configuration, wherein the piston head is in liquid tight contact with the piston body, because this movement is done in the direction of the orientation of the lip. Consequently, the lip can be turned upside down during this movement when it enters in contact with the piston body. Since, in the current embodiment, the recess portion is arranged below the sealing gasket, the movement of moving the piston head from a position facing the recess portion to a position where the piston head cooperates with the sealing portion is done in a direction opposite the orientation of the lip. In this manner, the lip cannot be turned upside down during this movement. That particular orientation of the gasket lip allows a large movement of the piston head in the CIP configuration. The piston head is not limited to reciprocate within the CIP recess area. The course of the piston head during the CIP phase or configuration can extend, if necessary, all along or along the sum of the CIP recess and the sealing portion. This allows providing very strong liquid turbulences and increases the cleaning efficiency.

In a CIP process, the simplicity of the CIP product circuit is also important and a very important feature that this invention provides is a simpler CIP product circuit having the simplest flow as possible.

According to another feature of the invention, the height of the periphery of the piston head measured along the piston axis is less than the height of the recess portion measured along the piston axis.

This arrangement allows making sure that the cleaning liquid is able to flow all around the piston head when the piston head is placed in the recess portion.

The invention also relates to a method for forming a preform into a container and filling the container using a pressurized liquid, the method using at least one injection device as described above and at least one liquid source, the inlet duct being in fluidic communication with the liquid source, the method comprising a step of reciprocating the piston head in the piston body along the piston axis in a liquid tight manner such that liquid from the liquid source is admitted into the inner chamber when the piston head is moved in a first direction and pressurized liquid is injected into the preform when the piston heads is moved in a second direction opposite the first direction, the pressurized liquid flowing from the inner chamber into the injection head via the outlet ducts.

As explained above, this method allows producing containers at high rate with a piston head operated with simultaneously high liquid pressure and high flow rate without damaging the piston head.

According to another feature of the method of the invention, each outlet duct generates a liquid pressure drop between the outlet port of the outlet duct and the injection head during liquid injection into the preform, all the pressure drops substantially having the same value.

BRIEF DESCRIPTION OF THE DRAWINGS

Other aspects and advantages of the invention will appear upon reading the following description, given by way of example and made in reference to the appended drawings, wherein.

DETAILED DESCRIPTION OF THE INVENTION

In the application, "liquid" has a physical meaning. It designates any substantially incompressible medium able to flow. The liquid can have a low viscosity (like water or alcohol), a medium viscosity (like eatable oil or soup), or a high viscosity (like yoghurt or creamy product). The liquid can be homogeneous or not homogeneous (including fruit pulp or bits of foodstuff). It is not limited to foodstuff. The liquid may be for example water, or other beverages, body care products, home and garden care products, medical fluids, fuels, operating fluids, and the like.

In the application, the terms "upstream" and "downstream" are defined with respect to the direction of the flow of liquid circulating in the injection device from a liquid source to a preform.

Figure 1:
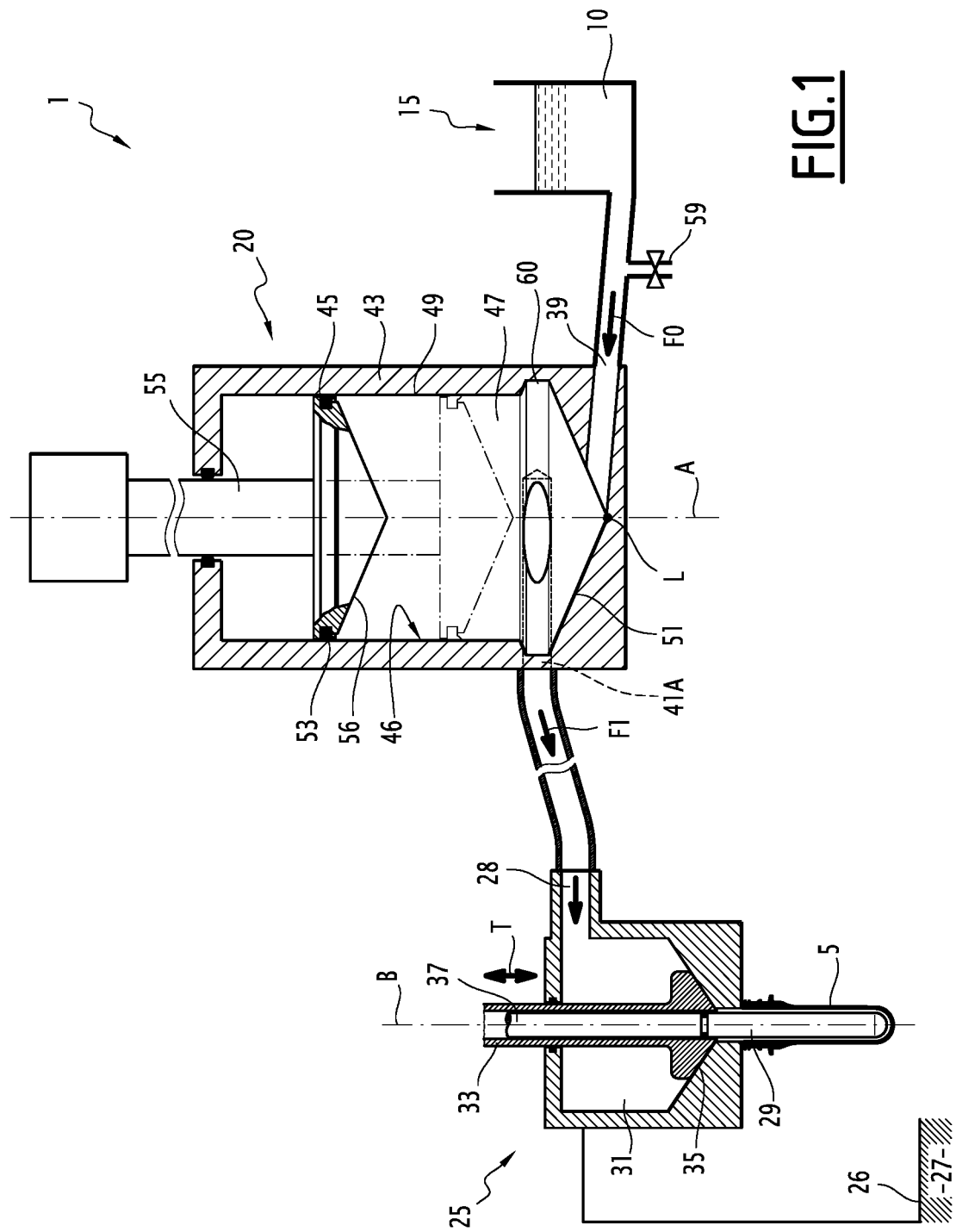
FIG. 1 is a diagrammatical axial cross-section view of an injection device according to a first embodiment the invention.

Referring to FIG. 1, there is described an injection device 1 according to a first embodiment of the invention. The injection device 1 is included in a forming and filling station for forming a preform 5 into a container and filling the container using a liquid 10. The forming and filling station further comprises a mould cavity 6.

The injection device 1 mainly comprises a liquid source 15 for providing the liquid 10, a piston device 20 for pressurizing the liquid, and an injection head 25 for injecting the liquid into the preform 5. The injection device 1 also comprises a base 26 intended to be in horizontal contact with a floor 27.

The liquid source 15 and the injection head 25 are conventional in this type of station and will not be described in great detail herein. In particular, the injection head can move vertically.

The liquid source 15 is for example a reservoir (shown in FIG. 1).

The injection head 25, or injection nozzle, comprises an inlet 28, and an outlet 29. The injection head 25 defines an injection chamber 31 extending between the inlet 28 and the outlet 29. The injection head 25 further includes a hollow control rod 33 extending in the chamber 31 along an injection axis B.

The outlet 29 is adapted to be in fluidic communication with the preform 5, to fill the preform with the liquid coming from the inlet 8.

The injection chamber 31 defines an inner volume temporarily receiving the liquid to be injected in the preform 5 via the outlet 29.

The injection axis B is preferably substantially perpendicular to the base 26, that is to say substantially vertical in the example.

The hollow control rod 33 comprises a sealing ring 35 at its end extending in the chamber 31. The hollow control rod 33 is movable in translation along the injection axis B in the chamber 31 between a sealing position, shown in FIG. 1, wherein the sealing ring 35 is applied against a wall of the chamber 31 and hermetically closes the chamber 31, and an injecting position, wherein the sealing ring 35 is spaced apart from the wall and wherein the outlet 29 is in fluidic communication with the inlet 28 via the chamber 31.

In the case of hydraulic forming and in a conventional manner, a stretch rod 37 optionally extends inside the hollow control rod 33, passes through the outlet 29 and extends in the preform 5 to assist in the deformation of the preform into a container, as known per se. The stretch rod 37 is movable in translation along the injection axis B in the hollow control rod 33, as shown by an arrow T in FIG. 1.

As a variant, the injection head 25 is implemented without a stretch rod, in which case the control rod 33 does not need to be hollow, and/or with a movable injection nozzle (not represented), adapted to be retracted in order to allow easily moving the preform 5 or the filled container under the injection head, as known per se.

The piston device 20 comprises at least an inlet duct 39 (FIGS. 1 and 2), $N_D$ outlet ducts 41A, 41B (FIG. 3), $N_D$ being an integer, which is at least equal to 2, a piston body 43, and a piston head 45 arranged to reciprocate in the piston body along a piston axis A.

For example the piston axis A forms an angle with a vertical direction, the angle being smaller than 30°, preferably smaller than 10°.

The piston axis A is for example substantially parallel to the injection axis B, that is to say vertical in the example.

The piston body 43 is for example made of a single rigid block or rigid elementary bodies rigidly fixed together, so that the piston body forms a single unit, able to move vertically. In another example, the injection head 25 can move vertically while the piston body 43 is fixed with respect to the base 26, a flexible hose connecting the piston body 43 to the injection head 25.

The piston body 43 is for example formed of a hollow casing. The piston body 43 for example has a square or circular section perpendicularly to the piston axis A, i.e. in a radial plane.

The piston body 43 comprises an internal wall 46. The piston body 43 and the piston head 45 together define an inner chamber 47 for temporarily receiving the liquid to be injected into the preform 5.

The wall 46 comprises a substantially cylindrical portion 49 along which the piston head 45 reciprocates, and a complementary portion 51, facing the piston head and defining the bottom side of the inner chamber 47.

The cylindrical portion 49 extends along the piston axis A.

The complementary portion 51 for example has a conical shape. The complementary portion 51 defines a lowermost area L which, in the example, is the summit of the conical shape.

The piston head 45 comprises a sealing gasket 53 in liquid tight fitting with a sealing portion of the cylindrical portion 49 of the wall 46, and a contact surface 56 intended to be in contact with the liquid intended to be injected in the preform 5. As shown in FIGS. 1, 2, 5 and 9, the contact surface 56 is for example conical and points downwards.

The sealing gasket 53 advantageously includes a lip 57, for example made of rubber, in order to ensure leak tightness between the piston body 43 and the piston head 45. The lip 57 is oriented towards the complementary portion 51 or toward the lowermost area L, meaning that the lip 57 extends from an end attached to piston head 45 to a free end extending in the inner chamber 47 towards the complementary portion 51, as more particularly visible in FIGS. 2, 5 and 9. The lip 57 has a resilient behaviour which tends to urge the lip 57 against the wall 46 in the sealing portion of the cylindrical portion 49 to ensure liquid tightness between the piston head 45 and the wall 46 in the sealing portion. The lip 57 is arranged such that the liquid tightness improves when the pressure of the liquid increases.

The inner chamber 47 is delimited by the complementary portion 51 of the wall 46, part of the cylindrical portion 49 of the wall, and the contact surface 56 of the piston head 45.

A control rod 55 is attached to the piston head 45 and extends along the piston axis A. The control rod 55 is connected to actuation means, such as a servomotor or other appropriate actuation means, arranged to control the movement of the control rod 55 and hence the movement of the piston head 45 relative to the piston body 43.

Figure 2:
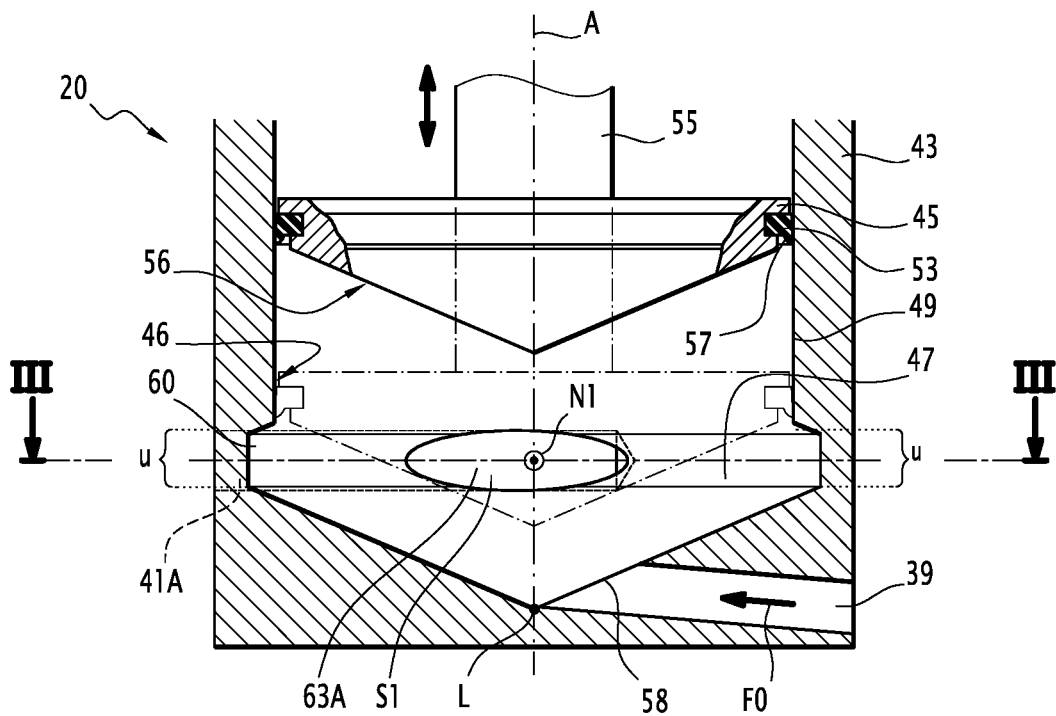
FIG. 2 is a diagrammatical axial cross-section view of the piston device represented in FIG. 1.

The piston head 45 is movable with respect to the piston body 43 along the piston axis A at least between two extreme positions shown in FIG. 2 and corresponding to the injection operation, such that the volume of the inner chamber 47 varies when the piston head 45 moves.

In an extreme down sealed position of the piston head 45, shown in dotted lines in FIG. 2, the inner chamber 47 has a minimum volume because the piston head 45 is brought close to the complementary portion 51. The extreme down sealed position corresponds to a lowermost position of the piston head 45 with respect to the piston body 43 for the injection operation.

In an extreme up sealed position, shown in solid lines, the inner chamber 47 has a maximum volume because the piston head 45 is spaced from the complementary portion 51 thereby enlarging the volume between the contact surface 56 and the complementary portion 51. The extreme up sealed position corresponds to an uppermost position of the piston head 45 with respect to the piston body 43 for the injection operation.

The inlet duct 39 extends between the liquid source 15 and the inner chamber 47 and selectively puts them in fluidic communication. The inlet duct 39 opens into the inner chamber 47 and defines an inlet port 58 in the wall 46.

The inlet duct 39 further comprises closing means (not represented) adapted to prevent the liquid selectively from flowing back from the inner chamber 47 to the liquid source 15. The inlet duct 39 also comprises a purge system 59 suitable for purging the inner chamber 47, that is to say for extracting the liquid, for example for cleaning purposes.

The inlet port 58 advantageously is located in the lowermost area L of the wall 46. According to the embodiment shown in the figures, the inlet port 58 is therefore located in the complementary surface 51.

The outlet ducts 41A, 41B extend between the piston device 20 and the inlet 28 of the injection head 25 in order to allow fluidic communication between the inner chamber 47 and the injection chamber 31.

In the example represented in the figures, the inlet 28 is common to all the outlet ducts 41A, 41B. As a variant (not represented), there are two or more inlets 28 corresponding to the number of outlet ducts 41A, 41B.

The outlet ducts 41A, 41B respectively comprise upstream portions 61A, 61B (FIG. 3) which open in the inner chamber 47 and define $N_D$ outlet ports 63A, 63B in the wall 46. $N_D$ is an integer which is at least equal to 2 and corresponds to the number of outlet ducts 41A, 41B. The outlet ports 63A, 63B extend in the cylindrical portion 49 or in the complementary surface 51. Advantageously, the outlet ports 63A, 63B extend in the cylindrical portion 49 in an uppermost area U of the wall 46 that is just below the piston head 45 when the latter head is in the extreme down sealed position. In other words, the outlet ports 63A, 63B are located below and in the immediate vicinity of the piston head 45 when the latter is in its extreme down sealed position. As explained previously, this position of the outlet ports is advantageous for the air purge operation.

The outlet ports 63A, 63B are each centered on a center, and are arranged such that all the centers of the outlet ports extend in the same radial planes, i.e. at the same height measured along the piston axis A, at an equal distance from the piston axis A and such that they are angularly regularly distributed around the piston axis (A). By center, it is meant, for a circular outlet port, the center of the circle formed by the port and for an outlet port having a different shape, the barycentre of the shape. By angularly regularly distributed around the piston axis (A), it is meant that the angle formed between two successive outlet ports 63A, 63B and the piston axis (A) in a radial plane is the same for all the ports and is constant, as will be explained subsequently.

Each outlet duct 41A, 41B is respectively configured to generate an equal liquid pressure drop between the outlet port 63A, 63B and the injection head 25 during liquid injection into the preform 5, meaning that all the pressure drops have substantially the same value, as will be explained subsequently. This equal liquid pressure drop can be obtained by appropriately varying the length, the shape of the flow path, and/or the flow section along the flow path, and/or by adjusting some optional flow deflecting element, for each outlet duct to adapt the liquid pressure drop generated by the outlet duct to pressure drop generated by the other duct(s).

According to the embodiment shown in FIGS. 1 to 4, the injection device comprises two outlet ducts 41A, 41B.

Figure 3:
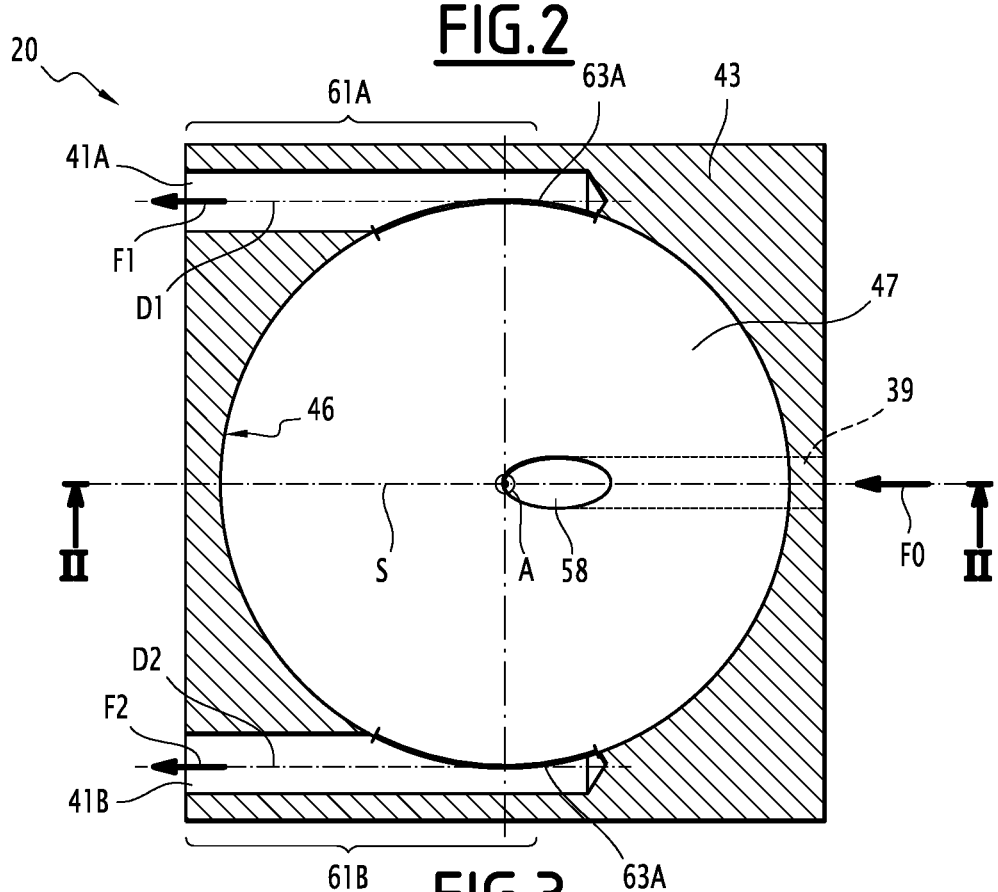
FIG. 3 is a diagrammatical cross-section view of the piston device represented in FIGS. 1 and 2 perpendicularly to the piston axis.
Figure 4:
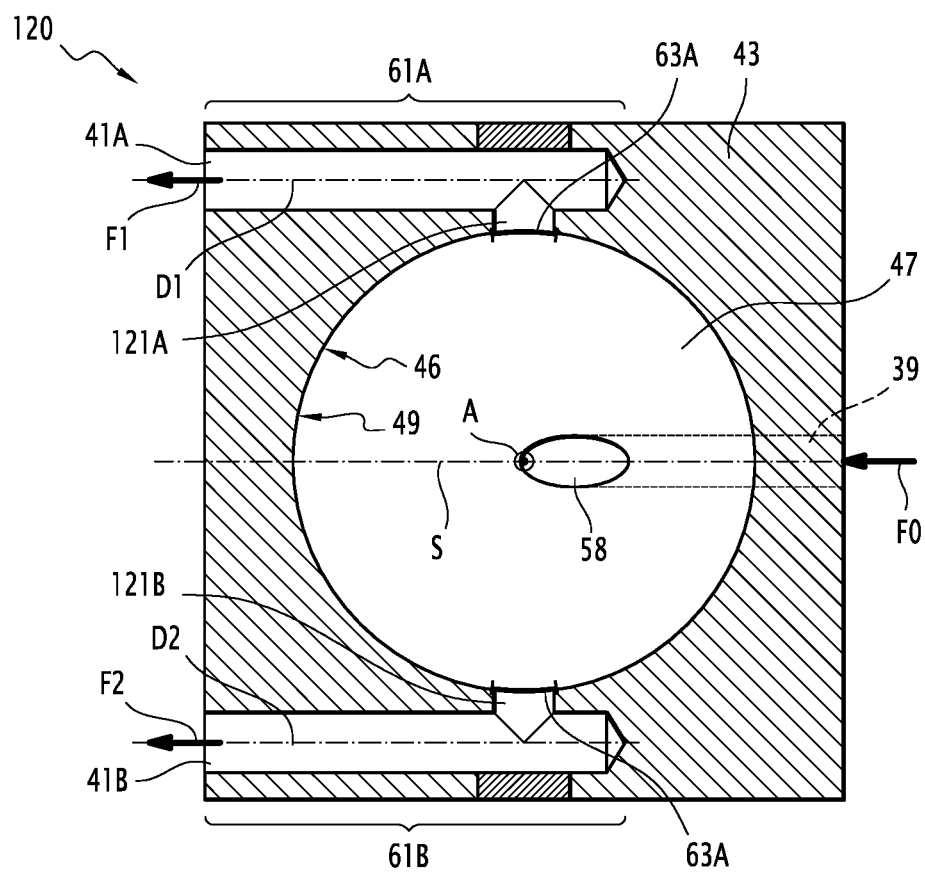
FIG. 4 is a diagrammatical cross-section view, perpendicularly to the piston axis, of a piston device according to a variant of the piston device shown in FIGS. 1 to 3.

In this case, the outlet ports 63A, 63B are substantially symmetrical to each other with respect to a symmetry plan (S) containing the piston axis (A). The constant angle formed between the two outlet ports centres is equal to 180°. Consequently, in the case of an inner chamber 47 of circular cross-section, the outlet ports 63A, 63B are diametrically opposed as shown in FIGS. 3 and 4.

Also in this case, the outlet ducts 41A, 41B are substantially identical, i.e. they have the same length from the outlet ports 63A, 63B to the injection head 25 and present substantially the same cross-section. In this manner, it is guaranteed that the liquid pressure drops generated by these ducts are the same.

The upstream portions 61A, 61B extend through the piston body 43 along duct directions D1, D2 that are for example substantially parallel to each other, and advantageously substantially perpendicular to the piston axis A. By substantially parallel, it is meant that the two duct directions D1, D2 form an angle with each other that is smaller than 10°.

The upstream portions 61A, 61B have a substantially constant cross section along their length.

According to the embodiment shown in FIG. 3, the upstream portions 61A, 61B are for example substantially tangent to the wall 46.

According to the embodiment shown in FIG. 4, the piston device 120 differs by the shape of the outlet ducts 41A, 41B.

In this embodiment, the outlet ducts 41A, 41B are not tangent to the wall 46. On the contrary, the outlet ducts 41A, 41B respectively comprise an entrance portion 121A, 121B extending radially between the inner chamber 47 and the upstream portions 61A, 61B.

The entrance portions 121A, 121B are for example substantially perpendicular to the wall 46.

A piston device 220 according to a second embodiment of the invention and shown in FIGS. 5 and 6 will now be described.

The piston device 220 is analogous to the piston devices 20 represented in the FIGS. 1 to 3. Similar elements have the same numeral or letter references and will not be described again. Only the differences will be described in detail here after.

The piston device 220 differs by having $N_D$ outlet ducts 241A, 241B, 241C (FIG. 6), with $N_D$ equal to 3 in this example.

The outlet ducts 241A, 241B, 241C respectively comprise upstream portions 261A, 261B, 261C which open in the inner chamber 47 and define three outlet ports 263A, 263B, 263C in the wall 46.

The upstream portions 261A, 261B, 261C for example form angles of approximately 120° with each other. This means that the angle between two successive outlet ports and the piston axis (A) is equal to 120°. In this case, these angles are the angles formed between outlet ports 263A and 263B and the piston axis (A), between outlet ports 263B and 263C and the piston axis (A) and between outlet ports 263C and 263A and the piston axis (A). Each of the upstream portions 261A, 261B, 261C is advantageously substantially radial with respect to the piston axis A. The outlet ports 263A, 263B, 263C are for example located in the complementary portion 51 in this embodiment at the same distance from the piston axis (A) and in the same radial planes.

Unless otherwise told, each outlet port 263A, 263B, 263C verifies the same geometric properties as those of the outlet ports 63A, 63B mentioned above.

The piston device 220 has the same advantages as the piston device 20.

Figure 7:
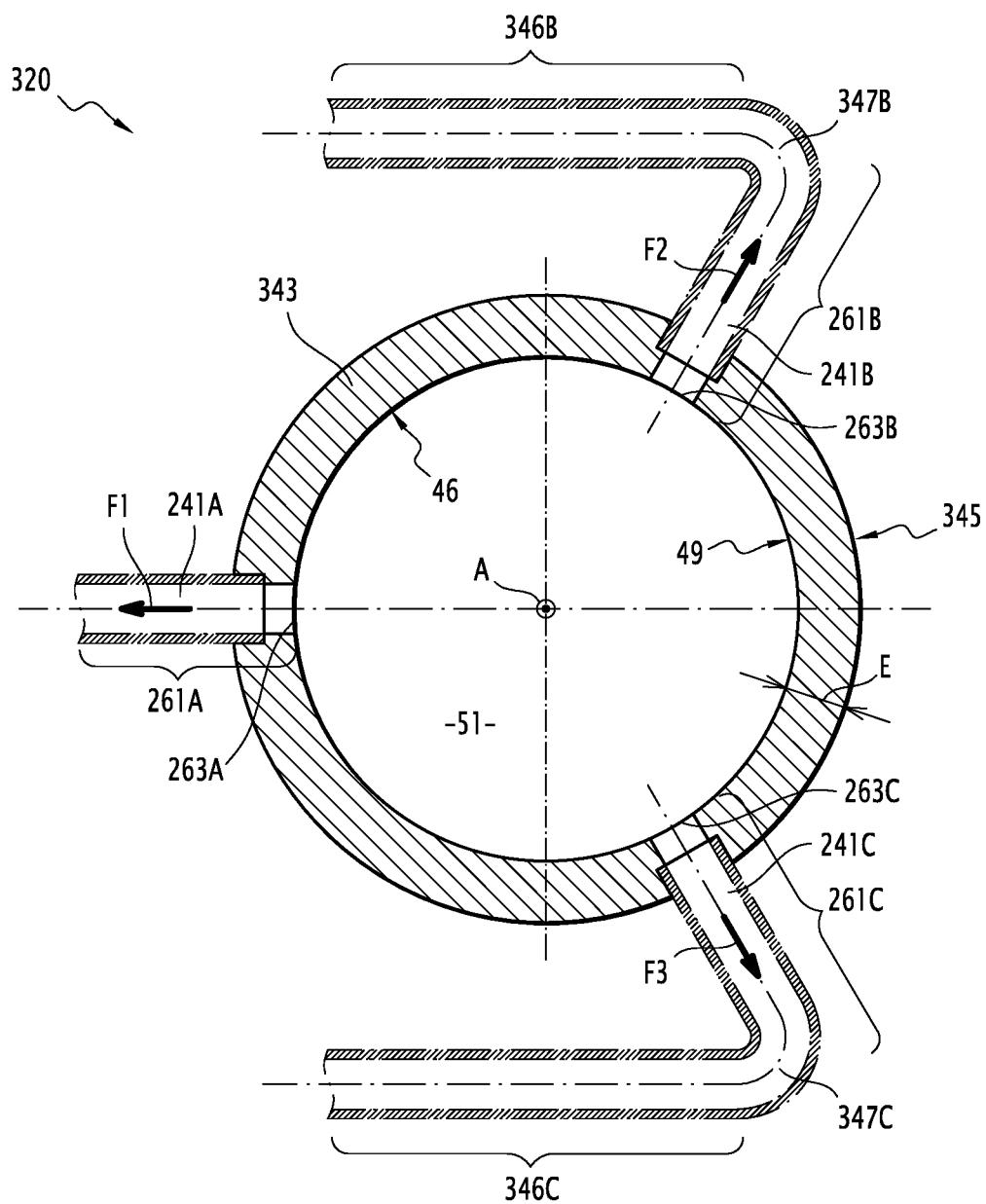
FIG. 7 is a diagrammatical cross-section view, perpendicularly to the piston axis, of a piston device according to a variant of the piston device shown in FIGS. 5 and 6.

A piston device 320 shown in FIG. 7 will now be described.

Figure 5:
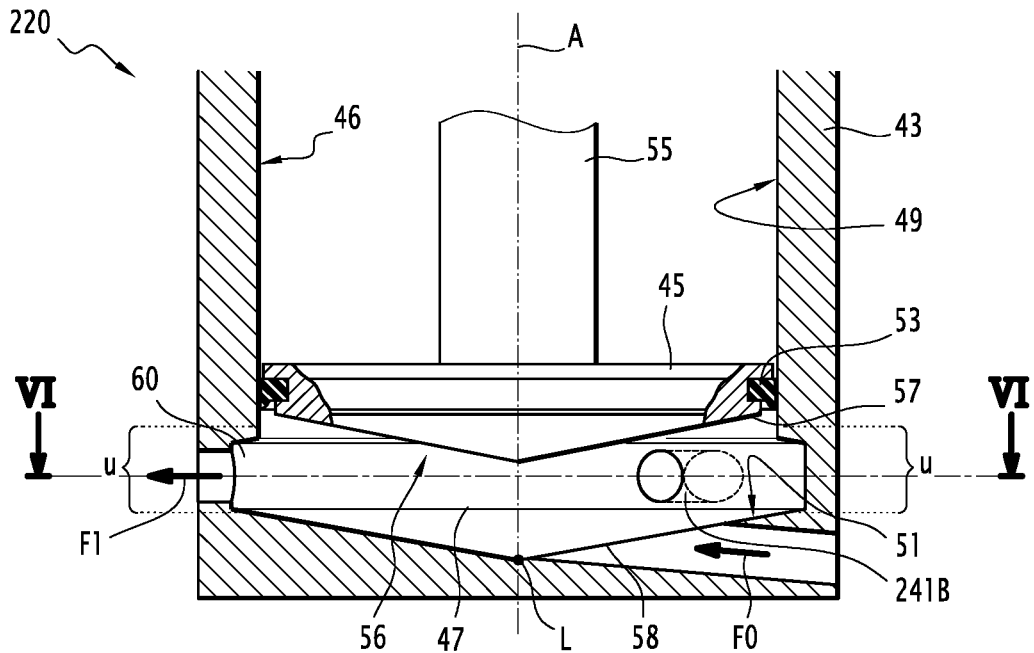
FIG. 5 is a diagrammatical axial cross-section view of a piston device according to a second embodiment the invention.
Figure 6:
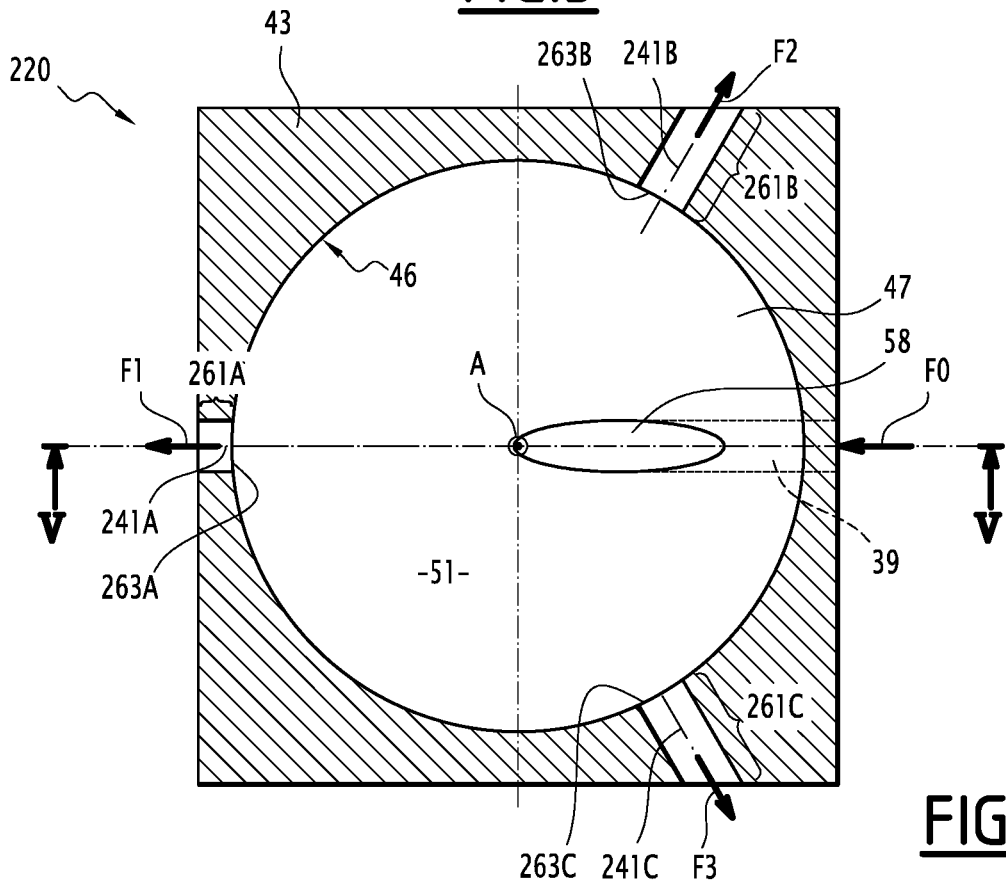
FIG. 6 is a diagrammatical cross-section view of the piston device represented in FIG. 5 perpendicularly to the piston axis.

The piston device 320 is a variant of the piston device 220 represented in FIGS. 5 and 6. The piston device 320 differs in that it comprises a piston body 343 having an external shape 345 that is substantially cylindrical and extends along the piston axis A.

Also, the outlet ducts 241B, 241C respectively comprise two middle portions 346B, 346C, and two elbows 347B, 347C located at the junction of the middle portions and the upstream portions 241B, 241C.

The two middle portions 346B, 346C are for example substantially parallel with the upstream portion 241A.

In this case, the outlet ducts are not all identical and their length and/or cross-sections have to be adapted such that the pressure drop generated by these outlet ducts remains the same.

The other elements are similar, have the same numeral references, and will not be described again.

Such a variant has the same advantages as the piston device 220.

In all the above embodiments, the piston device can also comprise a recess portion 60 for performing CIP, as will be explained subsequently. The recess portion 60 extends in the inner chamber 47 between the sealing portion of the cylindrical portion 49 and the complementary portion 51.

Figure 9:
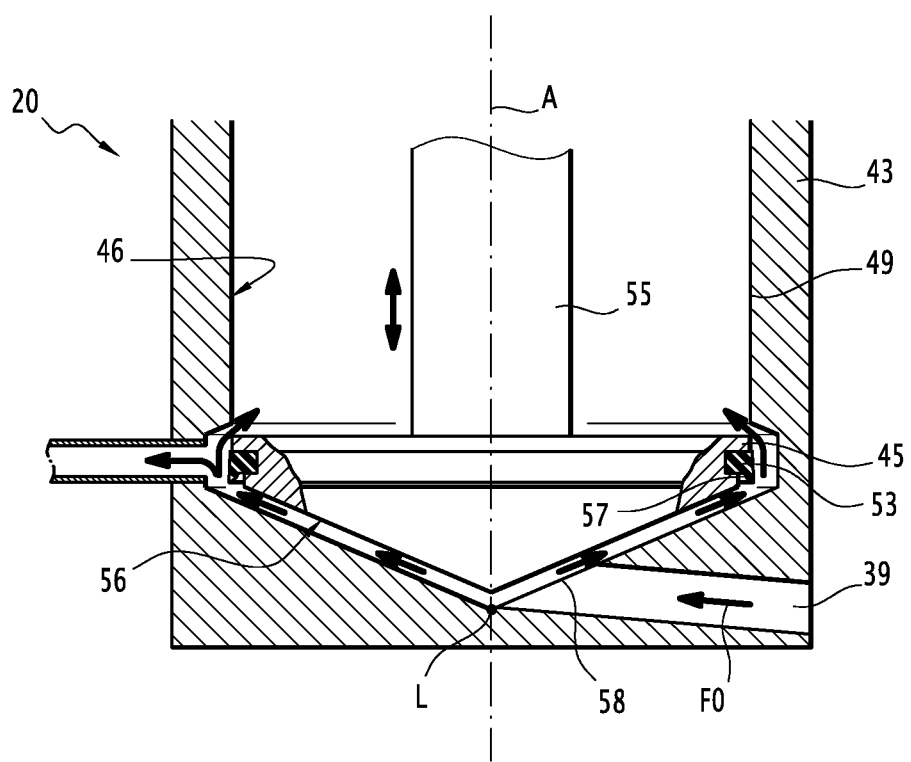
FIG. 9 is a detail of FIG. 8.

The recess portion 60 is arranged to locally enlarge the dimension of the inner chamber 47 in radial planes, i.e. to enlarge the diameter of the inner chamber 47 in case of an inner chamber 47 having a circular cross-section. More particularly, the dimension in radial planes of the recess portion 60 is arranged to be greater than the largest dimension of the piston head 45 in the radial planes such that, when the piston head 45 is placed in the recess portion 60, the piston head 45 is not in contact with the wall 46 of the piston body, as shown in FIG. 9.

Figure 8:
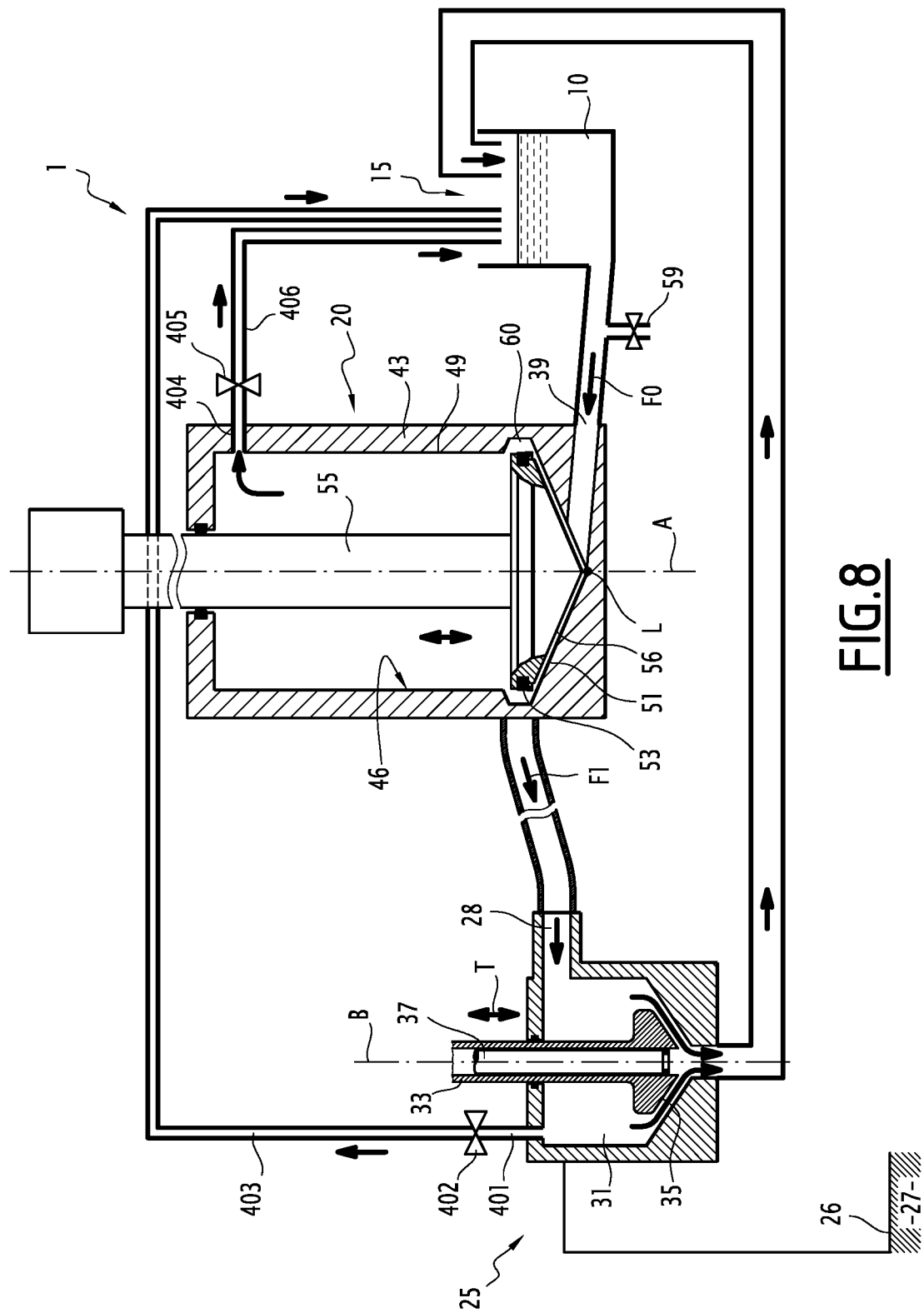
FIG. 8 is a diagrammatical axial cross-section view of a piston device of FIG. 1, the piston head being placed in a CIP configuration.

The recess portion 60 also has a height, measured along the piston axis A, that is greater than the height of at least the periphery of the piston head 45 measured along the piston axis A. In this manner, when the piston head 45 is placed in the recess portion 60, liquid can flow all around the piston head 45 as shown by the arrows of FIG. 8. According to the embodiment shown in FIGS. 8 and 9, the periphery of the piston head 45, i.e. where the sealing gasket 53 is attached to the piston head 45, has a height inferior to the height of the recess portion 60 while the central part of the piston head 45, i.e. around the piston axis A, has a height greater than the height of the recess portion 60. In this manner and thanks to the conical shape of the contact surface 56 if the piston head 45, the liquid flowing against the contact surface is properly guided towards the sealing gasket 53, as shown by the arrows of FIG. 8.

The recess portion 60 has for example the shape of an annular groove, the axis of which coincides with the piston axis A and which extends all around the inner chamber 47.

According to a preferred embodiment, the recess portion 60 extends at the same height according to the piston axis A than the outlet ports 63A, 63B, 263A, 263B, 263C open in the recess portion 60. As explained previously, this embodiment allows reducing the space requirement of the piston device 20, 120; 220, 320; 420. According to the embodiment shown in the figures, the recess portion 60 extends in the uppermost area U of the inner chamber 47. The functioning of the injection device 1 will now be described. Since the functioning is the same for all the embodiment described above, only the functioning of the first embodiment, with two outlet ports 63A, 63B will be described in detail here.

The functioning is cyclical, as several preforms analogous to the preform 5 are successively filled and formed with the liquid 10 coming from the liquid source 15.

In production mode, first the preform 5 is brought in a filling position with respect to the injection head 25, wherein the preform is in liquid tight contact with the outlet 29 of the injection head.

The control rod 33 is in its sealing position, wherein the liquid present in the chamber 31 is prevented from exiting through the outlet 29.

The piston head 45 is in the extreme down sealed position shown in dotted lines in FIG. 2. The inner chamber 47 has its minimal volume. The inner chamber 47 is filled with liquid and is in fluidic communication with the liquid source 15.

As part of its reciprocation movement, the piston head 45 is moved toward the extreme up sealed position shown in solid lines in FIG. 2. The liquid 10 flows from the liquid source 15 into the expanding inner chamber 47 via the inlet duct 39, as symbolized by an arrow F0 in FIGS. 1 to 3.

Then the inlet duct 39 is closed and the control rod 33 is moved from its sealing position to the injecting position. The piston head 45 may be moved from the extreme up sealed position back toward its extreme down sealed position shown in dotted lines in FIG. 2 by moving the piston head 45 against the sealing portion of the cylindrical portion 49 towards the complementary portion 51 in an injection direction. As the volume of the inner chamber 47 reduces, the liquid present in the inner chamber is pressurized for example up to 40 bar. The sealing gasket 53 prevents any leak upwards between the piston head 45 and the piston body 43. During the injection phase, the piston head 45 may move in the injection direction between any intermediary sealed position between the extreme up sealed position and the extreme down sealed position.

The liquid starts flowing toward the chamber 31 through each outlet port 63A, 63B, as shown by arrows F1, F2, and downstream into the preform 5 via the chamber 31.

Everywhere inside the inner chamber and in the upstream portion of the outlet ducts, the sum of the static pressure and of the dynamic pressure is constant or almost constant at any time. The liquid present in the inner chamber 47 presses by the static pressure against each part of the wall 46 with which the liquid is in contact. These parts of the wall 46 react by pressing on the liquid. However, in the areas corresponding to the outlet ports 63A, 63B, no or very little reaction occurs on the liquid, as the liquid "sees" no obstacle because the dynamic pressure is the main portion of the above constant.

The overall reaction of the wall 46 and the absence of reaction of the outlet ports 63A, 63B result in mechanical efforts applied by the liquid on the contact surface 56 of the piston head 45.

By arranging the outlet ports 63A, 63B in a regular manner around the piston axis A, the mechanical efforts are applied in an even manner on the contact surface 56 and are directed along a direction which is substantially parallel to the piston axis or are substantially equal to zero. This is due to the fact that the piston head 25 is moved in the injection direction with a speed which is high enough to create a static depressurization area close to each outlet port 63A, 63B. This depressurization defines for each outlet port a resultant vector of dynamic pressure originated at the outlet portcenter, oriented along the flow path of the liquid entering the outlet duct and having an intensity more than half of the average pressure exerted on the piston head 45. The outlet ducts are sized and positioned with respect to the piston body such that the sum of the resultant vectors of dynamic pressure for each port is substantially coaxial to the piston axis A.

Consequently, during the movement of the piston head 45 in the injection direction, the piston head 45 is not urged laterally against the wall 46 of the inner chamber 47 and the sealing gasket 53 is not subjected to an unwanted stress. So the risk, particularly after some time, of damaging the sealing gasket 53 and experiencing potential hygiene issues is decreased.

Having substantially similar pressure drops respectively between the outlet ports 63A, 63B and the chamber 31 helps achieving this result.

The same results are achieved when the piston device comprises three or more outlet ducts that are arranged such that the outlet ports are angularly regularly positioned around the piston axis A and such that the pressure drops generated by the outlet ducts are equal. In this case, when the piston head 45 is moved in the injection direction, the liquid starts flowing toward the chamber 31 through each outlet port 263A, 263B and 263C, as shown by arrows F1 to F3 of FIGS. 6 and 7 and the mechanical efforts applied on the contact surface remain directed along a direction which is substantially parallel to the piston axis or are substantially equal to zero.

After the preform 5 has been filled, the control rod 33 is put again in its sealing position and the preform is removed from its filling position.

Then, another cycle starts with another preform.

Thanks to the fact that the inlet port 58 is located in the inner chamber 47 in the lowermost area L, the inner chamber is easily purged by letting the liquid present in the inner chamber flow, for example by gravity, out of the inner chamber via the inlet duct.

Thanks to the fact that the outlet ports 63A, 63B are located in the uppermost area U of the inner chamber 47 at its minimal volume, air bubbles initially present in the inner chamber 47 are easily removed by flowing the liquid though the inner chamber via the outlet ducts 41A, 41B during an air purge operation as explained previously.

When CIP has to take place, for example when the liquid filling the container has to be changed or at regular interval, the piston head 45 can be moved in the recess portion 60. In this position, a cleaning liquid injected through the inlet port 58 is able to flow all around the piston head, as shown in FIG. 8, and to clean all parts of the piston device, and in particular the sealing gasket 53.

Placing the recess portion 60 in the inner chamber below the sealing portion of the cylindrical portion 49, in addition to allow saving space, helps preserving the sealing gasket 53. When the piston head 45 is moved in the recess portion 60, the lip 57 of the sealing gasket 53 is freed from its contact with the sealing portion and can be cleaned properly because of the turbulent liquid flow about the sealing gasket. To increase the turbulences in the liquid flow, the piston head may have a small reciprocating movement inside the recess portion 60.

Moving back the piston head 45 against the sealing portion is obtained by moving the piston head 45 in a direction opposite the injection direction, i.e. in an upward direction in the embodiments described above. During this movement, the end of lip 57 attached to the sealing gasket 53 enters first in contact with the sealing portion and the lip 57 is progressively applied against the sealing portion without the risk of turning the lip upside down as it is the case when the recess portion is placed above the piston head 45.

CIP can also comprise a step of reciprocating the piston head 45 against the sealing portion while a cleaning liquid is injected through the inlet port 58.

The liquid source is filled with cleaning liquid (in spite of beverage during the production mode). The turbulence of the cleaning liquid when the piston head is in the recess portion 60 provides efficient cleaning. The turbulence is mainly due to a main CIP circulation flowing from the inlet, passing through the recess, flowing through the outlet ducts, and the injection head 25. A dummy bottle, placed in fluidic communication with the outlet 29 of the injection head 25, collects the cleaning liquid, which is arranged to flowback to the liquid source.

In another CIP circulation, the cleaning liquid flows from the inlet 39, passes through the recess 60, the outlet ducts 41A, 41B, 241A, 241B, 241C and the injection chamber 31, and comes back to the liquid source through a first auxiliary port 401, a first auxiliary valve 402 and a first auxiliary duct 403.

In a further CIP circulation, the cleaning liquid flows from the inlet 39, passes through the recess 60 and cleans the upper side of the piston head and of the piston body and come back to the liquid source through a second auxiliary port 404, a second auxiliary valve 405 and a second auxiliary duct 406.

A strong advantage of having the CIP recess inside the inner chamber 47 and bellow the sealing portion is to allow large reciprocation of the piston head. This provides large liquid turbulences of the cleaning liquid and a very efficient CIP.

A further advantage of the particular arrangement of the CIP recess is that the various cleaning liquid circulations can all use the same inlet. In the traditional CIP recess (outside the inner chamber used for production configuration), the cleaning liquid had to be provided alternatively through the inlet 39 and then through the second port 404. The CIP recess of the current embodiment allows much simpler and less expensive valves system for managing the various CIP circulations.

As a person skilled in the art will really appreciate, the above description is meant as an illustration of at least one implementation of the principles of the present invention. This description is not intended to limit the scope or application of this invention since the invention is susceptible to modification, variation and change without departing from the spirit of this invention, as defined in the following claims.

The invention claimed is:

1. An injection device for a forming and filling station for forming a preform into a container and filling the container using a pressurized liquid, the injection device comprising:
    at least one injection head for injecting the pressurized liquid into the preform; and
    at least one piston device having a piston body, and a piston head arranged to reciprocate in the piston body along a piston axis, the piston head cooperating in a liquid tight manner with a sealing portion of the piston body as to fluidically isolate an inner chamber of the piston device, the piston body having an inlet duct configured to be in fluidic communication with a liquid source for admitting liquid into the inner chamber, the piston body further including at least two outlet ducts for delivering pressurized liquid from the inner chamber to the injection head, each outlet duct opening into the inner chamber and defining an outlet port in a wall of the inner chamber, each outlet port being centered on an outlet port center;
    wherein all the outlet port centers extend in the same radial plane of the inner chamber and are at the same distance from the piston axis and are arranged angularly in an equidistantly spaced manner around the piston axis.

2. The injection device according to claim 1, wherein the injection head comprises an injection chamber, the outlet ducts configured for communicating liquid from the inner chamber of the piston body to the injection chamber of the injection nozzle, the outlet ducts being further configured to generate an equal liquid pressure drop between the outlet ports and the injection chamber during liquid injection into the preform.

3. The injection device according to claim 1, wherein each of the outlet ducts has an upstream portion extending within a meridian plane passing by the piston axis wherein the axis of each upstream portion forms an angle with the piston axis which is the same for each outlet duct, and
    wherein the cross section profile and the shape of the outlet ducts are such that the speed of the liquid passing thought each outlet port is identical or almost identical.

4. The injection device according to claim 1, wherein the inner chamber of the piston device is in fluidic communication with the injection head by only two outlet ducts which are symmetrical to each other with respect to a symmetry plane containing the piston axis.

5. The injection device according to claim 1, wherein each of the outlet ducts has an upstream portion extending along a duct direction substantially tangent to the wall of the inner chamber.

6. The injection device according to claim 1, wherein the wall of the piston body is one of a cylindrical, conical, or truncated cone shape.

7. The injection device according to claim 1, wherein the piston head is designed to occupy an extreme down sealed position with respect to the piston body during reciprocation, the inner chamber having a volume that is minimal when the piston head is in the extreme down sealed position, the inlet port opening at a lowermost area of the inner chamber and each outlet port being located at an uppermost area of the inner chamber when the piston head is in the extreme down sealed position.

8. The injection device according to claim 1, wherein the piston body comprises a recess portion located in the inner chamber such that when the piston head is placed in the recess portion, the piston head is not in liquid tight contact with the piston body such that liquid can flow from the inner chamber to a part of the piston body extending on the side of the piston head opposite the inner chamber.

9. The injection device according to claim 8, wherein the recess portion is an annular groove extending around the inner chamber and locally enlarging the radial dimension of the inner chamber measured perpendicularly to the piston axis.

10. The injection device according to claim 8, wherein the outlet ports open into the recess portion.

11. The injection device according to claim 8, wherein the piston body comprises a cylindrical portion comprising the sealing portion along which the piston head is in liquid tight contact with the piston body and a lowermost area of the inner chamber, the recess portion extending between the sealing portion and the lowermost area.

12. The injection device according to claim 11, wherein the piston head comprises a sealing gasket ensuring liquid tight contact between the piston head and the sealing portion, the sealing gasket comprising a lip oriented towards the inner chamber, such that the lip can be applied against the sealing portion without being turned over when the piston head is moved from the recess portion away from the lowermost area.

13. The injection device according to claim 8, wherein the height of the periphery of the piston head measured along the piston axis is less than the height of the recess portion measured along the piston axis.

14. A method for forming a preform into a container and filling the container using a pressurized liquid, the method using at least one injection device and at least one liquid source, an inlet duct being in fluidic communication with the liquid source, the method comprising the steps of:

reciprocating a piston head in a piston body along a piston axis in a liquid tight manner such that liquid from the liquid source is admitted into an inner chamber when the piston head is moved in a first direction and pressurized liquid is injected into the preform when the piston head is moved in a second direction opposite the first direction, the pressurized liquid flowing from the inner chamber into the injection head via outlet ducts.

15. The method according to claim 14, wherein each outlet duct generates a liquid pressure drop between the outlet port of the outlet duct and the injection head during liquid injection into the preform, all the pressure drops substantially having the same value.

* * * * *